United States Patent [19]

Orr

[11] 4,378,170
[45] Mar. 29, 1983

[54] PANEL EDGE POTTER
[75] Inventor: David R. Orr, Sumner, Wash.
[73] Assignee: The Boeing Company, Seattle, Wash.
[21] Appl. No.: 210,062
[22] Filed: Nov. 24, 1980
[51] Int. Cl.³ .................. B28B 11/08; B28B 11/18;
                                                  B05C 17/10
[52] U.S. Cl. .................................. 401/5; 401/193;
              401/195; 401/261; 401/265; 425/87; 425/289
[58] Field of Search ............... 401/5, 193, 195, 265,
                                         401/261; 425/87, 289

[56]                References Cited
           U.S. PATENT DOCUMENTS

| | | | |
|---|---|---|---|
| 2,104,086 | 1/1938 | Lines | 425/87 |
| 2,678,557 | 5/1954 | Black | 401/5 |
| 2,692,706 | 10/1954 | Wiksten | 222/326 |
| 3,358,343 | 12/1967 | Kahili | 425/289 |
| 3,651,994 | 3/1972 | Nordenholt | 222/160 |
| 3,768,939 | 10/1973 | Granling | 425/87 |
| 3,813,012 | 5/1974 | Laird | 222/326 |
| 3,957,406 | 5/1976 | Battersby | 401/193 X |
| 3,980,209 | 9/1976 | Collar | 222/323 |
| 3,983,947 | 10/1976 | Wills et al. | 173/169 |

FOREIGN PATENT DOCUMENTS 755571  8/1980  U.S.S.R. ............................. 425/289

Primary Examiner—Steven A. Bratlie
Attorney, Agent, or Firm—Conrad O. Gardner; B. A. Donahue

[57]                ABSTRACT

A hand held honeycomb edge potter utilizing air pressure and piston means for the expulsion of the potting compound, the honeycomb edge potter further incorporating a wire element which functions to shave or dress the material to the desired configuration.

2 Claims, 6 Drawing Figures

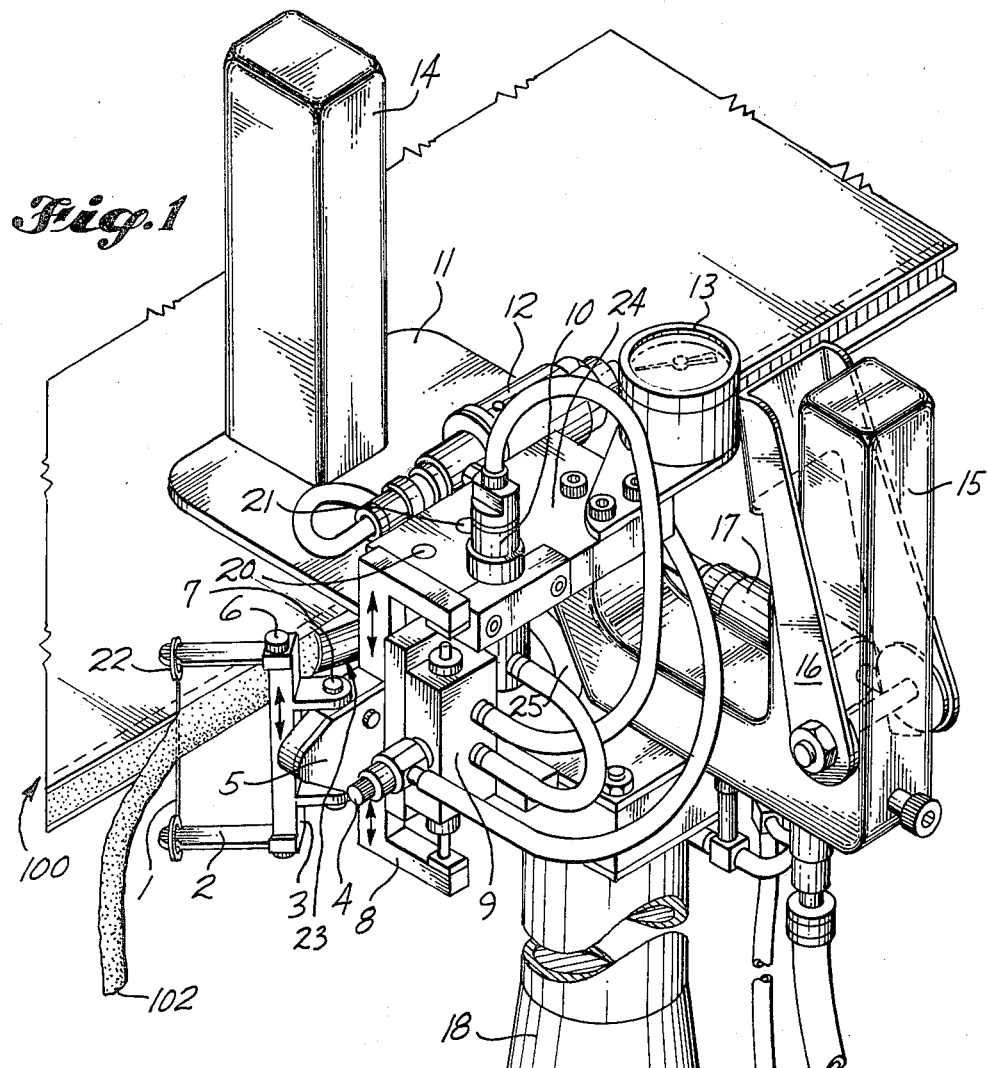
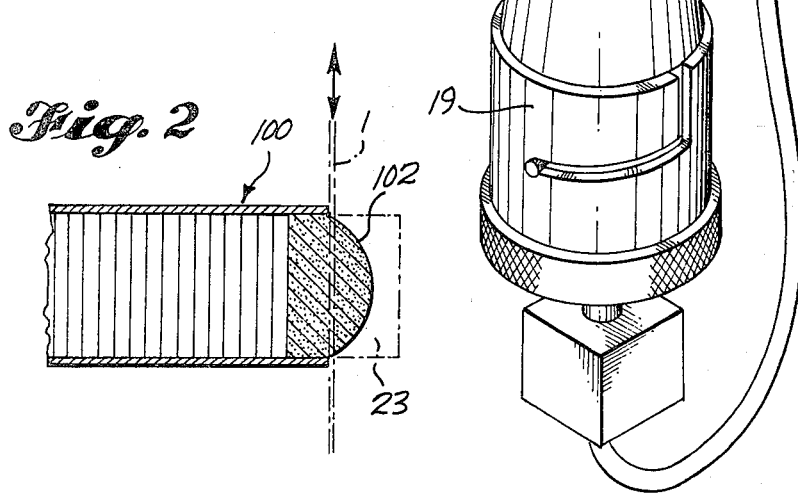

PANEL EDGE POTTER

This invention relates to methods and apparatus for applying sealant to edges of panel structures and more particularly to a panel edge potting method and apparatus for pressing epoxy into a prepared panel while shaving off any excess in a single operation.

Heretofore, various prior art patent literature references have included some tools which utilize air pressure for the expulsion of potting materials as seen among some of U.S. Pat. Nos. 3,813,012; 3,651,994; 3,983,947; 3,980,209; and 2,692,706; however, none of these relate to honeycomb panel edge potting per se.

In actual practice, the edges of honeycomb core floor panels in aircraft must be sealed and reinforced. This is done by routing the honeycomb back about one-tenth of an inch, and then filling the slot with an epoxy paste. The epoxy is mixed and pressed into the slot by hand and is shaped so that it has a convex surface extending beyond the outer edge sheets forming the walls of the honeycomb core sandwich type panel structure. The panel is then set aside for a predetermined time period of about 24 hours to cure. At the end of this predetermined time period, the convex surface is filed flat to the outer edge sheet ends.

Accordingly, it is an object of the present invention to reduce the number of steps required in edge potting of honeycomb panel structures, e.g., by reducing the number of panels requiring filing off of potting compound subsequent to curing.

It is a further object of this invention to reduce the instances of human contact of the operator with epoxy during edge potting of honeycomb panel slots.

It is another object of the present invention to provide a method and apparatus for accomplishing panel edge potting by pressing and shaving steps in a single operation by the operator.

According to an embodiment of the present invention, a shaving off of excess potting compound extending from the sandwich panel slot is accomplished by drawing a thin oscillating wire along the edge of the panel. The thin wire is held in a follower which is attached to a carriage by a pivot. A torsion spring holds the wire firmly on the panel. The present structural configuration prevents the wire from catching on the panel when the operator moves the present panel edge potter around a corner of the panel. The carriage slides back and forth on a pair of rods, and is driven by an air cylinder. Arms directed upwardly from the carriage switch the air valve back and forth, which controls the air cylinder. Epoxy is supplied in plastic cartridges disposed within the pressure cylinder. A pressure relief cap feature of the present panel edge potter prevents pressure from rising to undesired levels, the pressure relief cap consisting of a twist on cap, a disk spring, spacer, and a floating seal which is held against the plastic cartridge by the spring until air pressure overcomes the spring force. A piston inside the plastic cartridge on top of the epoxy permits air pressure to push the epoxy out of the cylinder, the epoxy moving through a tube into an applicator foot which straddles the edges of the panel workpiece. The applicator foot presses the epoxy into the prepared edge of the panel, leaving a convex shaped epoxy surface which is shaved flat by the thin wire.

Other objects and features of a preferred embodiment of the present invention will become readily apparent from the following detailed description taken in conjunction with the drawings in which:

FIG. 1 is a view in perspective of a preferred embodiment of the present potting compound applicator utilized as shown for applying, packing, and shaving off a compound in flowable viscous state to the prepared edge slot of a honeycomb core panel;

FIG. 2 is a panel section illustrative of the relationship of applicator foot removal of potting compound;

Figure 3:
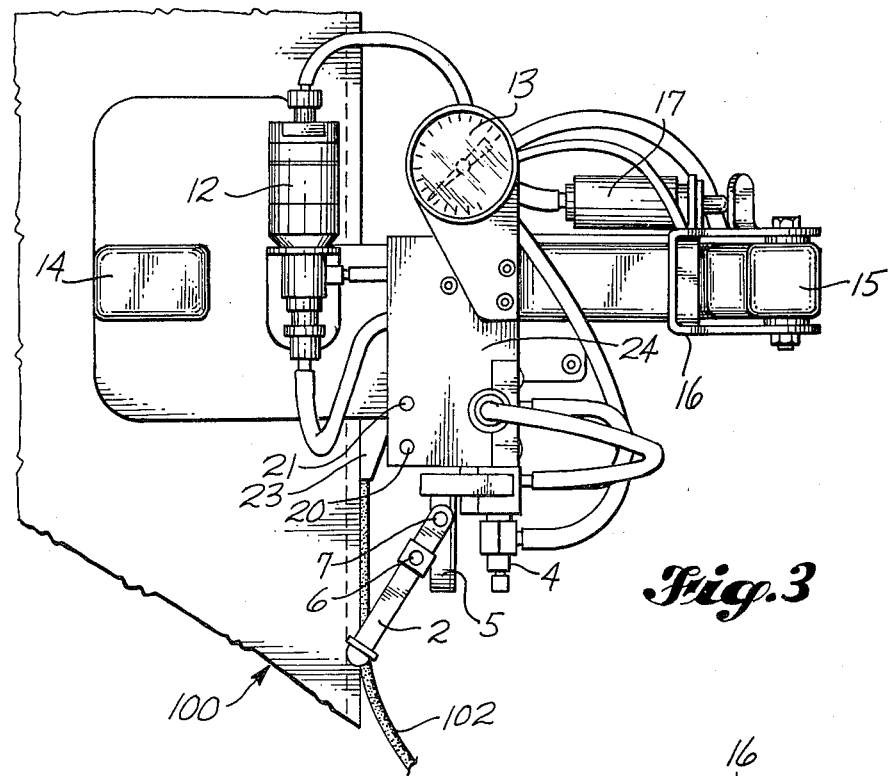
FIG. 3 is a top view of the potting compound applicator of FIG. 1.

Turning now to the potting compound applicator of FIG. 1, it can be seen that the apparatus comprises handles 14 and 15, a tube 18, an oscillating wire 1, a pressure regulator 17, an air piloted two-way valve 12, a four-way valve 9, an air cylinder 10, a carriage 5, a pressure limiter 19, and an applicator foot 23.

The potting material comes supplied in a plastic cylinder that fits inside tube 18. Pressure limiter 19 is screwed into position with a one-fourth turn twist. A rubber gasket is utilized for pressing upon the upper lip of the plastic tube containing the potting compound thereby effecting an air tight seal. The rubber gasket is held on the plastic tube by means of a spring which will deflect if the pressure inside the cylinder becomes excessive, allowing excess pressure to escape around the rubber gasket.

Figure 4:
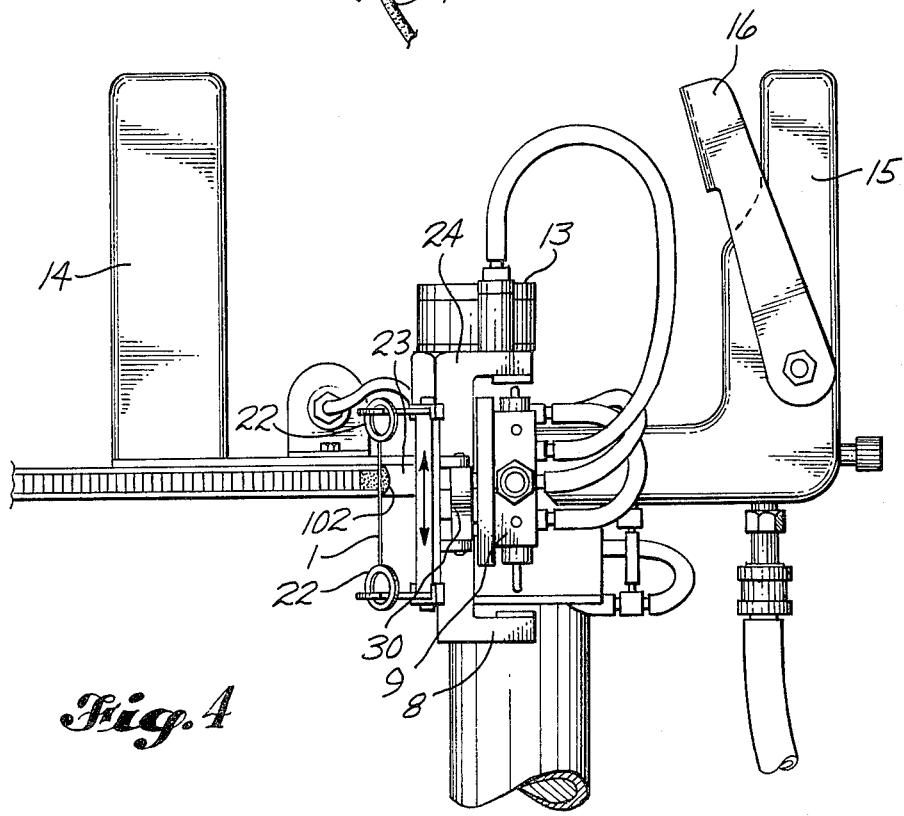
FIG. 4 is a rear view of the potting compound applicator of FIG. 1.
Figure 5:
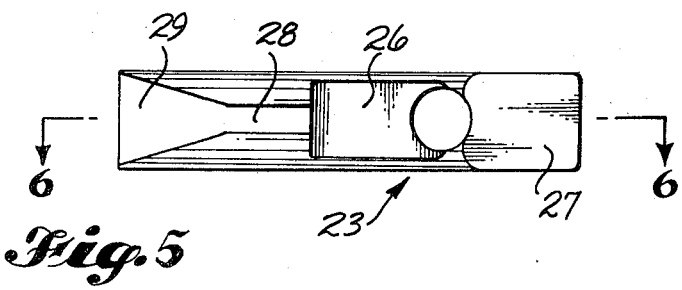
FIG. 5 is a bottom view of the applicator foot of the potting compound applicator of FIG. 1.
Figure 6:
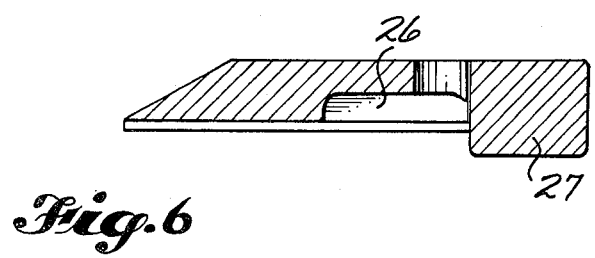
FIG. 6 is a section of the applicator foot taken along the line 5—5 of FIG. 5.

As lever 16 is squeezed the plunger on air regulator 17 is depressed thereby causing fluid pressure in the cylinder, the pilot of air pilot valve 12, and the tube 18, to rise simultaneously. The pilot on valve 12 will cause the valve to switch when the pressure in tube 18 reaches 2 psig. This supplies air at 90 psig to the inlet port of four-way valve 9, which four-way 9 is a manually piloted valve. Valve 9 is connected to cylinder 10 in such manner that when the spool of valve 9 is shifted to the left, the air cylinder is driven to the right. The air cylinder is held firmly in the main body 24. The rod of cylinder 10 is attached to carriage 5 which is slideable on rods 21 and 20. A pair horns 8 are rigidly attached to carriage 5. The pair of horns 8 are held in such a manner that they come in contact with the pilots of valve 9 when the carriage approaches its limit of movement either to the left or right, thereby causing the spool to shift, and further driving cylinder 10 in the opposite direction. Attached to carriage 5 via pivot 6 as seen in FIGS. 1 and 3 are spring arms 2. These springs hold wire 1 in tension. Wire 1 is welded as seen in FIGS. 1 and 4 to a set of rings 22. Rings 22 fit into corresponding notches on spring arms 2 and transmit the tension to wire 1. Carriage 5 provides motion back and forth of wire 1 as seen in FIGS. 1, 3, and 4. Should wire 1 break, replacement of this assembly is easily accomplished. As lever 16, as seen in FIGS. 1 and 4, is squeezed further, the pressure in tube 18 will continue to rise, and is monitored by gauge 13. The potting compound is of sufficient viscosity so that any pressure below 30 psig will not cause motion thereof. As the pressure rises above 30 psig, the potting compound will begin to move out of its plastic container. This potting compound is guided through rigid conduit 25 (as seen in FIG. 1) into applicator foot 23. Applicator foot 23 is seen from FIGS. 5 and 6 to comprise a cavity 26, guide 27, packing portion 28, and smoothing portion 29. The potting compound flows into the cavity 26 and slows down due to the increased volume. Guide 27 holds applicator foot 23 on the edge of panel 100 and prevents the potting compound from escaping to the front. Having no other course of direction to proceed, the epoxy is forced into packing section 28 and down into the edge of panel 100, and, further packed and smoothed by smoothing portion 29. Smoothing portion 29 ends with a sharp edge to prevent the pulling away of large portions of potting compound. The aforementioned process leaves an excess hemispherically shaped portion of potting compound 102 on the edge of panel 100 as seen in FIG. 2. Wire 1, as hereinbefore discussed is held on the edge of panel 100 by spring 30 (seen in FIG. 4). Spring 30's oscillating action shaves off excess potting compound 102 extending beyond the ends of the panel walls thereby leaving a finished edge.

What is claimed is:

1. A hand held honeycomb panel edge potter comprising in combination:
    a foot member having a passage, packing, and smoothing portions;
    air pressure and piston means for expulsion of a potting compound through said passage and along said packing and smoothing portions of said foot member for applying the potting compound to a honeycomb panel edge;
    a wire element disposed behind the trailing edge of said foot member for shaving potting compound extending outside said panel edge from said panel edge;
    a carriage adapted to provide back and forth motion of said wire element;
    said carriage including a pivot for coupling a pair of spring arms to said carriage;
    a pair of rings disposed in notches in said respective pair of spring arms, said pair of rings connected to respective ends of said wire element for transmitting tension between said spring arms and said ends of said wire element; and,
    a torsion spring for holding said wire element on the edge of a honeycomb panel edge.

2. The invention according to claim 1 wherein said wire element is supported by spring means for providing wire oscillation.

* * * * *